US012432240B2

(12) United States Patent
Jones et al.

(10) Patent No.: US 12,432,240 B2
(45) Date of Patent: Sep. 30, 2025

(54) GENERATIVE ARTIFICIAL INTELLIGENCE SECURITY ENGINE IN AN ITEM LISTING SYSTEM

(71) Applicant: eBay Inc., San Jose, CA (US)

(72) Inventors: Shaun Thomas Jones, Austin, TX (US); Gary Duane Bland, Jr., Meadville, PA (US); Jack Edward Reardon, Shelby Township, MI (US)

(73) Assignee: eBay Inc., San Jose, CA (US)

( * ) Notice: Subject to any disclaimer, the term of this patent is extended or adjusted under 35 U.S.C. 154(b) by 150 days.

(21) Appl. No.: 18/502,606

(22) Filed: Nov. 6, 2023

(65) Prior Publication Data
US 2025/0150474 A1    May 8, 2025

(51) Int. Cl.
*H04L 9/40*       (2022.01)
*G06N 3/0455*   (2023.01)
*G06N 3/08*       (2023.01)

(52) U.S. Cl.
CPC ....... *H04L 63/1425* (2013.01); *G06N 3/0455* (2023.01); *G06N 3/08* (2013.01); *H04L 63/1416* (2013.01)

(58) Field of Classification Search
CPC ............ H04L 63/1425; H04L 63/1416; G06N 3/0455; G06N 3/08; G06N 3/045; G06N 3/047; G06N 3/0475; G06F 21/60
See application file for complete search history.

(56) References Cited

U.S. PATENT DOCUMENTS

| | | | |
|---|---|---|---|
| 12,008,332 B1 * | 6/2024 | Gardner | G06F 16/345 |
| 12,282,719 B1 * | 4/2025 | Fedoruk | G06F 30/27 |
| 2021/0240892 A1 * | 8/2021 | Meinders | G06F 30/27 |

OTHER PUBLICATIONS

Anonymous, "Announcing OpaquePrompts: Hide your sensitive data from LLMs", Walden Catalyst, 2023, 4 pages.
European Search Report received for European Application No. 24210196.2, mailed on Mar. 19, 2025, 19 pages.
Helbling et al., "LLM Self Defense: By Self Examination. LLMs Know They Are Being Tricked", Available at : <arXiv:2308.07308v1 [cs.CL] Aug. 14, 2023>, Aug. 14, 2023, 7 pages.

(Continued)

*Primary Examiner* — Sm A Rahman
(74) *Attorney, Agent, or Firm* — Shook, Hardy & Bacon L.L.P.

(57) ABSTRACT

Methods, systems, and computer storage media for providing generative artificial intelligence (AI) security management using a generative AI security engine in an item listing system. A generative AI security engine supports generative AI security management based on security analysis and detection operations for a plurality of generative-AI-supported applications and generative AI models. In operation, a request associated with prompt data is communicated from a generative AI client. Based on communicating the request, a response that is generated based on a redacted version of the prompt data is received at the generative AI client. The prompt data is analyzed using a plurality of security engine operations to cause generation of the redacted version of the prompt data. The redacted version of the prompt data is used to generate the response at a generative AI model. The response is caused to be generated at an interface associated with the generative AI client.

20 Claims, 14 Drawing Sheets

(56) References Cited

OTHER PUBLICATIONS

Kumar et al., "Certifying LLM Safety Against Adversarial Prompting", Available at : <arXiv:2309.02705v1 [cs. CL] Sep. 6, 2023>, Sep. 6, 2023, 13 pages.
Sharathkumar, S., "How the web works", Available at: <https://www.FourZeroThree.in>, Apr. 6, 2021, 11 pages.
Shayegani et al., "Survey of Vulnerabilities in Large Language Models Revealed by Adversarial Attacks", Available at : <arXiv:2310.10844v1 [cs.CL] Oct. 16, 2023>, Oct. 16, 2023, 54 pages.

* cited by examiner

GENERATIVE ARTIFICIAL INTELLIGENCE SECURITY ENGINE IN AN ITEM LISTING SYSTEM

BACKGROUND

Users can interact with generative artificial intelligence technologies in different types of applications and services to accomplish computing tasks. Generative AI refers to a class of AI systems and algorithms that are designed to generate new data or content that is similar to, or in some cases, entirely different from data they are trained on. Generative AI systems can create support text generation, image generation, music and audio generation, video generation and data synthesis. In particular, generative AI systems can support an item listing system in several ways to improve operational efficiency, customer engagement, and online shopping. For example, an item listing system may employ a generative AI system for content generation (e.g., product descriptions), personalized shopping experiences (e.g., recommendation engines), product discovery (e.g., visual search), and virtual assistants (e.g., chat bots). The item listing system can leverage generative AI through Application Programming Interfaces (APIs), pre-trained models, and custom AI solutions to enhance item listing system functionality.

SUMMARY

Various aspects of the technology described herein are generally directed to systems, methods, and computer storage media for, among other things, providing generative AI security management using a generative AI security engine in an item listing system. A generative AI security engine supports generative AI security management based on security analysis and detection operations of generative-AI-supported applications ("generative AI applications") associated with a generative AI model (e.g., a Large Language Model "LLM") and prompt interfaces. In particular, the generative AI security engine provides generative AI security engine operations ("security engine operations") including intent detection, prompt attack detection, restricted data detection and redaction, and prompt context with redaction that are employed to protect against potential data privacy and data leakage issues for generative AI applications.

In operation, prompt data from a generative AI client is accessed, the prompt data is associated with a request for a generative AI model that supports an artificial intelligence system. The prompt data is analyzed based on pre-processing security engine operations, the pre-processing security engine operations support determining how to communicate the prompt data associated with the request to the generative AI model or determining to block the request. Based on analyzing the prompt data, a redacted version of the prompt data is generated for the generative AI model, the redacted version of the prompt data comprising a redacted data tag associated with a redacted portion of the prompt data. The redacted version of the prompt data is communicated to the generative AI model. A response from the generative AI model is accessed and analyzed based on post-processing security engine operations, the post-processing security engine operations support determining how to communicate the response to the generative AI client or determining to block the response. Based on analyzing the response, communicating the response to the generative AI client or blocking the response to the request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Overview

Figure 1A:
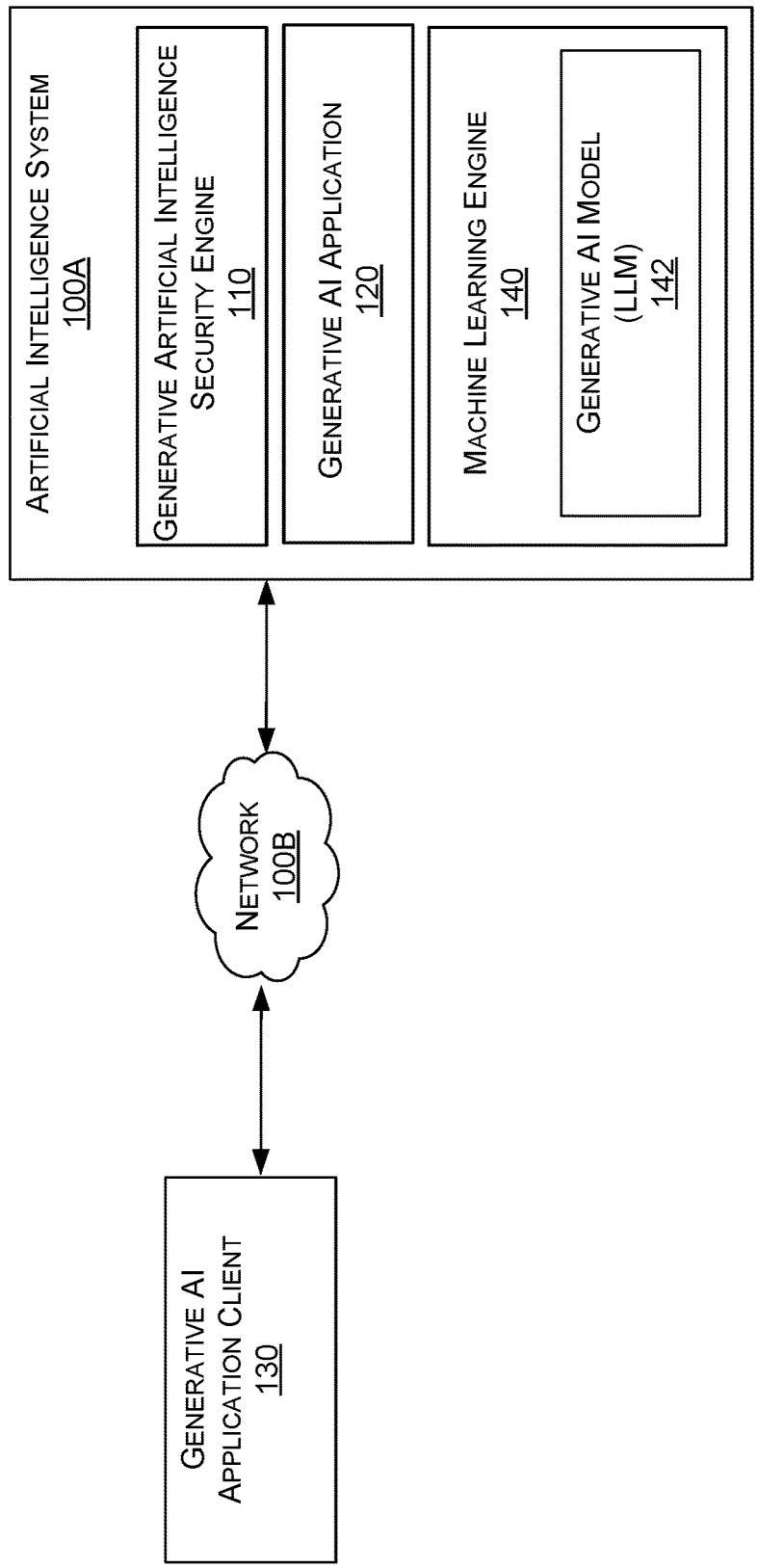
FIGS. 1A and 1B are block diagrams of an artificial intelligence system for providing generative AI security management in an item listing system, in accordance with aspects of the technology described herein.

An item listing system and platform support storing items (products or assets) in item databases and providing a search system for receiving queries and identifying search result items based on the queries. An item (e.g., physical item or digital item) refers to a product or asset that is provided for listing on an item listing platform. Search systems support identifying, for received queries, result items from item databases. Item databases can specifically be for content platform or item listing platforms such as EBAY content platform, developed by EBAY INC., of San Jose, California. An item listing system may also provide generative-AI-supported applications ("generative AI applications") that leverage generative AI models (e.g., Large Language Models—"LLM") to create, generate, or produce content, data or outputs. LLMs are a specific class of generative AI models that are primarily focused on generating human-like text. Generative AI models, like GPT (Generative-Pre-trained Transformer) and its variants, are designed to generate human-like text or other types of data based on the input they receive (e.g., via a prompt interface). These applications use generative AI to perform various task across different domains to provide improvement in automation, efficiency, and human-like interaction.

Conventionally, item listing systems are not configured with a comprehensive logic and infrastructure to effectively provide generative artificial intelligence (AI) security management for an item listing system. The use of generative AI models in an item listing system can raise data privacy concerns and may create governance and data leakage problems via an unsecure prompt interface. For example, a textual prompt or input—via a prompt interface that supports interacting with a generative AI model—that can generate a response based on understanding of the language and context—may be associated with misinformation and fake content, harmful or offensive content, automated attacks, and spam and abuse.

Moreover, prompt interface security can be challenging to implement. By way of illustration, prompt injection can be a security threat from prompt interfaces. Prompt injection attacks can be performed on LLM prompt interfaces, where prompt injection includes manipulating the LLM based on injecting information that diverts the LLM from its intended purpose. Adversaries can leverage this type of exploit to circumvent safeguards or filters, as well as to gain access to sensitive data. Another concern around generative AI models has arisen with regard to the data loaded into the LLMs for training or fine tuning. If content that is used in training is malicious or contains sensitive information, the content could be disclosed with responses by the LLM which could create privacy violations or brand damage. With the threat of data leaks through generative AI models, different types of users or customers of the generative AI models may be hesitant to share confidential intellectual property if they risk data leakage.

Merely implementing conventional security infrastructures—without a generative AI security engine—causes deficient functioning of an item listing system. For example, traditional security infrastructures lack new threat signatures, as traditional security measures rely on known threat signatures, patterns, or known malicious entities. Moreover, AI models generate text responses that are contextually relevant and human-like, making it challenging to predefine threat signatures. Other limitations with conventional security infrastructures include the dynamic and context-dependent nature of threats, complexity of natural language, and irresponsible AI use. As such, a more comprehensive item listing system—with an alternative basis for performing item listing system security operations—can improve computing operations and interfaces for providing generative AI security management with prompt interface security.

Embodiments of the present invention are directed to systems, methods, and computer storage media for, among other things, providing generative AI security management using a generative AI security engine in an item listing system. A generative AI security engine supports generative AI security management based on security analysis and detection of generative-AI-supported applications ("generative AI applications") associated with generative AI models (e.g., a Large Language Model "LLM") and prompt interfaces. In particular, the generative AI security engine provides security engine operations including intent detection, prompt attack detection, restricted data detection and redaction, and prompt context with redaction that are employed to protect against potential data privacy and data leakage issues for generative AI applications. Generative AI security management is provided using the generative AI security engine that is operationally integrated into the item listing system associated with an artificial intelligence security system. The artificial intelligence security system supports a generative AI security engine framework of computing components associated with security engine operations (e.g., pre-processing security engine operations, post-processing security engine operations, and training dataset security engine operations) for providing generative AI security management.

At a high level, the generative AI security engine can be provided as a security framework to support securely employing generative AI models (e.g., LLMs) in an artificial intelligence system. The artificial intelligence system may specifically be an implementation in an item listing system. The generative AI security engine can be an LLM security solution that that provides security engine operations associated with sensitive data leakage detection and prevention; sensitive data redaction to enable LLMs context on the redacted data while ensuring safe use of the LLMs; detection of abuse of the LLMs or malicious intent (e.g., prompt attack); detection of use that is deemed illegal, unethical or breach of company policies; and prompt logging and searching (e.g., post incident). The generative AI security engine can implement functional components that provide operations for pre-processing security engine operations, post-processing security engine operations, and training dataset security engine operations associated, by way of example, with the following: intent detection, prompt attack detection, restricted data detection and redaction, and prompt context with redaction.

Intent detection can include leveraging an intent detection security model (e.g., neural network machine learning model) and embeddings to classify input text (e.g., prompt data of a request) into security categories, where a training dataset already has similar security categories. Input text can be classified into one or more of the following categories: prompt attack, malicious intent, violent intent, insult or slurs, unlawful intent, hateful intent, non-English characters, and other. Based on the categorization of the input text, the generative AI security engine can further be configured to take actions including blocking a request associated with the input text from being communicated to the generative AI model.

Prompt attack detection can include determining if an intent of an input text is to manipulate or extract information from the LLM. A prompt attack security model (e.g., a neural network machine learning model) can be employed to support classifying prompt data of particular types of prompt attacks. Prompt data can be classified into different types of prompt attacks including, by way of example, the following: toxic or offensive content, bias amplification, political manipulation, extremism promotion, hate speech generation, privacy violation, malware generation, spam or phishing, abuse of service, or unintended results.

Restricted data detection and redaction can include the use of a regular expression engine to detect and employ a redact and replace engine to replace any hits (i.e., instances of prompt data identified as instances of suspicious prompt data) with placeholders that clearly state why the data was redacted. The regular expression engine can be associated with a false positive reduction model with pre and post processing rules to aid with decreasing false positives for instances of suspicious prompt data. A restricted data detection model (e.g., a NLP or LLM) and the redact and replace engine can also be implemented to support detecting sensitive data in prompt data associated with input text, redacting the sensitive data, and replacing the redacted sensitive data with a redacted data tag.

Prompt context with redaction can include providing placeholders (i.e., redacted data tags) for data types that are predefined to be redacted. Redaction, via the redact and replace engine, can be performed upon determining a prompt context. For example, for a social security number in a particular prompt context, can be replaced with a redacted data tag as follows: <SSN_placeholder_1>. The generative AI model can still process requests associated with the redacted versions of prompt data associated with input text a generative AI client. If the generative AI model returns the placed holder (e.g., <SSN_placeholder_1>, the generative AI security engine can re-insert the original text in the place of the placeholder providing the user with the original data.

The generative AI security engine can be used to ensure the security of a training dataset associated with a machine learning training pipeline for training generative AI machine learning models. In particular, training data security engine operations are implemented on training dataset (e.g., data instances of the training dataset) before the training dataset is used in training a generative AI model. Training data security engine operations can be executed to ensure that no questionable or sensitive data—that could lead to data leakage or other generative AI security vulnerabilities—are included within the generative AI model that is being trained.

It is contemplated that the generative AI security engine can be implemented in different types of artificial intelligence systems associated with different types of operating environments. The implementation of the generative AI security engine in an artificial intelligence system associated with an item listing system is exemplary and not meant to limit other variations and combinations of implementing the generative AI security engine in other types of systems.

Advantageously, the embodiments of the present technical solution support providing generative AI security management using a generative AI security engine in an item listing system. A generative AI security engine supports generative AI security management based on security analysis and detection operations for a plurality of generative-AI-supported applications and generative AI models. The generative AI security engine operations provide a solution to problems (e.g., prompt interface security vulnerabilities, data leakage, and data privacy) in generative AI security. The generative AI security engine components, infrastructure, and ordered combination are an improvement over conventional security systems that lack support for generative AI security threats and attacks.

Aspects of the technical solution can be described by way of examples and with reference to FIGS. 1A-1F. FIG. 1A illustrates an item listing system 100 that includes artificial intelligence system 100A, network 100B, generative artificial intelligence security engine 110, generative AI application 120, generative AI application client 130, and machine learning engine 140. The item listing system 100 corresponds to item listing system 600 described below with reference to FIG. 6.

The item listing system 100 provides a system (e.g., artificial intelligence "AI" system 100A) that includes an engine (e.g., generative AI security engine 110) for performing operations (e.g., security engine operations) discussed herein. The generative AI security engine 110 can operate with the generative AI application client 130 (e.g., a client device) that can access the item listing system 100 to execute tasks using a generative AI application 120 associated with a corresponding generative AI model (e.g., an LLM 142). For example, a user—via the generative AI application client 130 (e.g., a prompt interface) —can communicate a request (e.g., a generative AI request having prompt data) to the generative AI application and the LLM to process the request. Based on the communicating the request, the generative AI security engine can execute security engine operations (e.g., pre-processing security engine operations, post-processing security engine operations, and training dataset security engine operations) with security components of the generative AI security engine 110—to ensure secure processing the request.

Figure 1B:
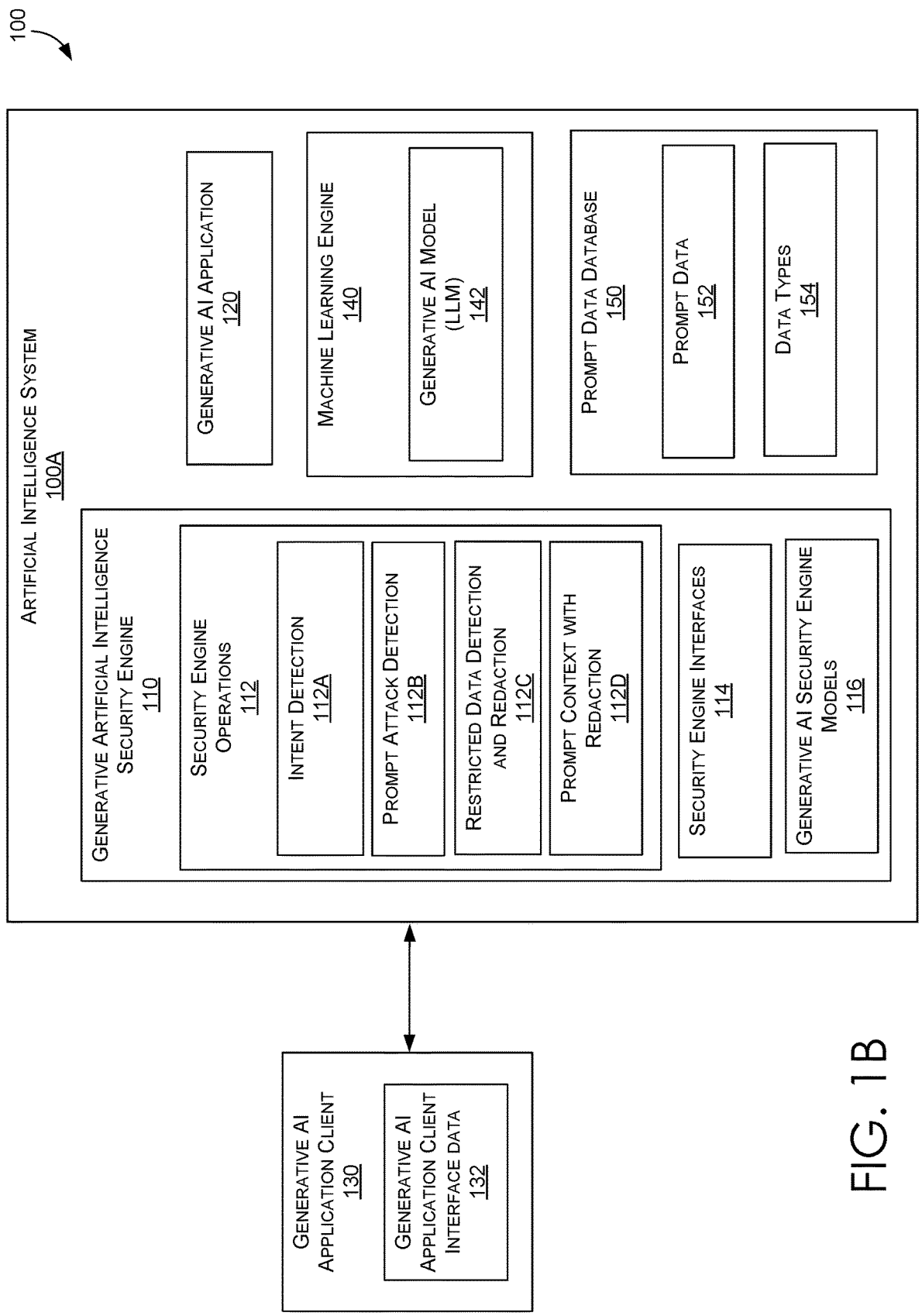

With reference to FIG. 1B, FIG. 1B illustrates artificial intelligence system 100A including generative AI intelligence security engine 110 having security engine operations 112 including intent detection 112A, prompt attack detection 112B, restricted data detection and redaction 112C, and prompt context with redaction 112D; security engine interfaces 114; generative AI security engine models 116; generative AI application 120; generative AI application client 130 having generative AI client interface data 132; machine learning engine 140 having generative AI model "LLM 142"); and prompt data database 150 with prompt data 152 and data types 154.

The generative AI security engine 110 and the generative AI application client provide interfaces (i.e., security engine interfaces 114 and generative AI application interface) and operations (i.e., security engine operations). The generative AI security engine 110 and the generative AI application client 130 can operate in a server-client relationship to provide generative AI security management. For example, a user can communicate a request from the generative AI application client 130 to execute a task via generative AI application 120 and LLM 142. Based on the request, the generative AI security engine 110 can perform security engine operations 112 to ensure secure processing of the request in the artificial intelligence system 100A.

The generative AI security engine 110 may execute security engine operations 112 based on prompt data associated with the request. The security engine operations 112 can include, by way of example, analyzing the prompt data to determine and intent associated with the prompt data (e.g., intent detection 112); analyzing the prompt data to determine whether the prompt data is associated with a prompt attack (e.g., prompt attack detection 112B); analyzing the prompt data to identify restricted data types and to redact restricted data types (e.g., restricted data detection and redaction); and determining a prompt context, and based on the context, redacting data types in prompt data (e.g., prompt context with redaction).

Security engine interfaces 114 can support communications between the generative AI security engine 110 and the generative AI client application 130, machine learning engine 140, LLM 142, and prompt data database 150. For example, the generative AI security engine 110 can receive prompt data from the generative AI application 120 or communicate prompt data to the generative AI application 120. The generative AI security engine 110 can communicate prompt data to LLM 142 and receive a response to the request from LLM 142. The generative AI security engine 120 can access data types (e.g., data types 154) and historical prompt data (e.g., prompt data 152) from the prompt data database 150.

The generative AI security engine 110 can communicate a response to a request from the generative AI application 130. The response can be a notification that the request has been blocked, the response can be a response to the request that was generated based on a redacted version of the request; or a response that was generated via the LLM 142 without redacting the request. The generative AI application client 130 can receive any of the different types of responses from the generative AI security engine 110 and cause display of the different types of responses on a graphical user interface (GUI) associated with the generative AI application. For example, generative AI application client interface data 132 can include the different types of responses and additional GUI interface elements associated with generative AI application client.

The generative AI security engine 110 is responsible for providing security engine operations 112 (e.g., pre-processing security engine operations, post-processing security engine operations, and training dataset security engine operations) in the artificial intelligence system 100A. Security engine operations 112 protect the infrastructure, data, and assets of the item listing system 100 from threats, vulnerabilities and incidents. In particular, the security engine operations protect against threats, vulnerabilities, and threats related to the implementation of generative AI technology via generative AI models and generative AI applications. The security engine operations 112 can be associated with intent detection 112A, prompt attack detection 112B, restricted data detection and redaction 112C, and prompt context with redaction 112D. It is contemplated that the security engine operations can be divided into three sets: pre-processing security engine operations, post-processing security engine operations, and training dataset security engine operations. Pre-processing security engine operations can be operations prior to communicating at least a portion of prompt data to the generative AI model; post-processing security engine operations can be operations after the prompt data has been processed at the generative AI model; and training dataset security engine operations can be operations for a machine learning training pipeline. The machine learning training pipeline can also be selectively associated with pre-processing security engine operations and post-processing security engine operations.

Security engine operations 112 can be explained by way illustration with reference to different scenarios including: prompt data retrieval; streamlining threat handling; security resource version checking; prohibited intent determination; regex evaluation; security context matching; model-based false positive reduction; model-based sensitive data evaluation; data type redaction vetting; redact and replace execution; generative AI processing; redacted data tag review; replace redacted data tags; prohibited term in response determination; response communication; request blocking; exclusion of data instances from training dataset; and approval of data instances from training dataset.

Prompt data retrieval can include retrieving and processing input and additional information from an interface (e.g., prompt interface) associated with an application (e.g., generative AI application client 130) and generative AI model (e.g., LLM 142). Prompt data retrieval can include processing text input from a text box, voice input, or API request. Prompt data can include a wide range of content and can be phrased as questions, statements, or commands. The prompt data can be associated with context parameters that can guide generating the response (e.g., a desired response language, style preferences, content restrictions, etc.). The prompt may further include special token (e.g., markers that are used within the prompt to instruct the generative AI model).

Streamlining threat handling can include optimizing and simplifying the processing of prompt data. Streamlining threat handling can be implemented to ensure efficient and effective prompt data evaluation. A database (e.g., prompt data database 150) can be maintained to include prompt data (e.g., prompt data 152) and similar variations that have previously been processed. The prompt data and variations can be associated with a description, attributes, vulnerabilities exploited, indicators of compromise and other relevant information for threat intelligence and incident response.

A subsequent instance of prompt data is compared to the instances of prompt data in the database (i.e., prompt data 152) to determine if the subsequent instance of prompt data is already in the database (i.e., a similar instance of prompt data was previously processed successfully—without security issues). Different types of matching techniques (e.g., exact matching, fuzzy matching, tokenization, semantic matching) can be used to determine if the subsequent prompt data has a match in the database. With streamlining threat handling, a first determination is made if an instance of prompt data in a database matches a subsequent instance of prompt data. If a match is identified, a second determination is made whether—since the instance of prompt data in the prompt database was processed—there have been any updates to the generative AI security engine models 116 or the data types 154. The instance of prompt data is processed for additional security operations if there have been updates; however, the instance of prompt data bypasses additional security operations if there have not been updates. In this way, additional processing is circumvented if the data types and the generative AI security engine models have not been updated.

Security resource version checking can include determining if data types (e.g., data types 154) or generative AI security engine models (e.g., generative AI security engine models 116) have been updated. Data types can include different sensitive data types that have been identified for security operations when identified in prompt data. Data types can include personal identifiable information (PII); financial data health information (PHI); and authentication data legal and compliance data, education data, location data, biometric data, sensitive business data; social media data; and criminal records. Data types may also be associated with prompt context and redaction, where data types are redacted for particular prompt contexts—but may not be redacted in other prompt contexts. Data types can be updated periodically to ensure comprehensive evaluation of prompt data based on different data types.

Generative AI security engine models (e.g., generative AI security engine models 116) can be different types of AI security models that employ artificial intelligence and machine learning to enhance security measures and protect against threats. These models are strategically implemented via the generative AI security engine 110 to support security operations. Some example models include models for identifying sensitive data (e.g., Natural Language Processing or deep learning); models for identifying false positives (e.g., anomaly detection models such as statistical models, clustering algorithms); and models for determining intent (e.g., intent classification models—recurrent neural networks (RNNs), convolutions neural networks (CNNs), and transformer models (e.g., BERT—Bidirectional Encoder Representations from Transformers) and GPT (Generative Pre-Trained Transformer).

Prohibited intent determination can include evaluating the prompt data to determine whether the prompt data includes prohibited intent (e.g., a malicious intent or banned intent). A generative AI security engine model can be used to process the prompt data to make the determination whether the prompt data is associated with prohibited intent. A regular expression engine can be employed to execute regex evaluation. The regex evaluation can include pattern matching assessment on the text in the prompt data. The regex can be used to find and extract specific data patterns. Regex can be implemented using a variety of tools (e.g., a regular expression library that provides advanced regular expression support). Security context matching can be performed to determine whether hit a regex matches a security threat context.

Model-based false positive reduction can include implementing a generative AI security engine model to evaluate the prompt data and output from one or more preceding pre-processing security operations to determine whether prompt data is a true positive. Data type redaction vetting can include evaluating whether a data type should be redacted. For example, analyzing the prompt data relative to a list of data types that have been identified for redacting. Redact and replace execution can include redacting a portion of data in prompt data that has been identified to be redacted and replaced the portion of data with a redacted data tag. It is contemplated that a prompt context can be evaluated such that based on the prompt context particular data types may be redacted from the prompt data. Generative AI processing can include communicating the redacted prompt data to the generative AI model to process the request.

Turing to redacted data tag review; replace redacted data tags; prohibited term in response determination; communication of response; and request blocking, these post-processing security engine operations can be performed after receiving a response from the generative AI model. The redacted data tag review can include determining whether the response from the generative AI model includes any redacted data tags. As discussed, the generative AI model can be configured to process prompt data with placeholders and generate responses with the placeholders such that the placeholders can be replaced with the redacted portion of the prompt data prior to communicating the response to the generative AI application client. The replace redacted data tags operation can include replacing the redacted data tags with the redacted portion of the prompt data (e.g., original data).

Prohibited term in response determination can include determining whether there exists a banned term or response in the response. The banned terms can be based on the data types 154 and additional terms identified as bad terms that are store in the prompt data database 150. The response from the generative AI model can be communicated (i.e., communication of response) if there are no banned terms in the response, or the request and response can be blocked from being processed and communicated if there exists a banned term in the response. It is contemplated that when the request is blocked a response can be communicated to the generative AI application client 130 indicating that the request has been blocked. The response can further include additional explanatory data and parameters associated with why the request was blocked. The response and the additional explanatory data and parameters can be integrated with generative AI client interface data including graphical user interface elements and displayed. Other variations and combinations of communicating a notification of a blocked response and communicating additional explanatory data and parameters are contemplated with embodiments described herein.

Turning to training dataset security engine operations, the training dataset security operations can include selected pre-processing security engine operations associated with exclusion from training dataset and approval for training dataset. These training dataset security engine operations can be implemented to process training datasets before the training datasets are used for model training. The training dataset security engine operations can ensure that no questionable and sensitive data is included in the training dataset that could lead to generative AI security exposure. The machine learning training pipeline can selectively implement pre-processing security engine operations and generative AI security models. The training dataset security operations can also include redact data and add synthetic data. Synthetic data refers to artificially generated data that mimics the characteristics of real data but does not contain information about actual individuals, objects, or events. It can be created using algorithms, statistical models, or other methods and is often used when real data is either unavailable, insufficient, or sensitive. At least portions of the training dataset can be approved for the training dataset or excluded from the training dataset.

Figure 1C:
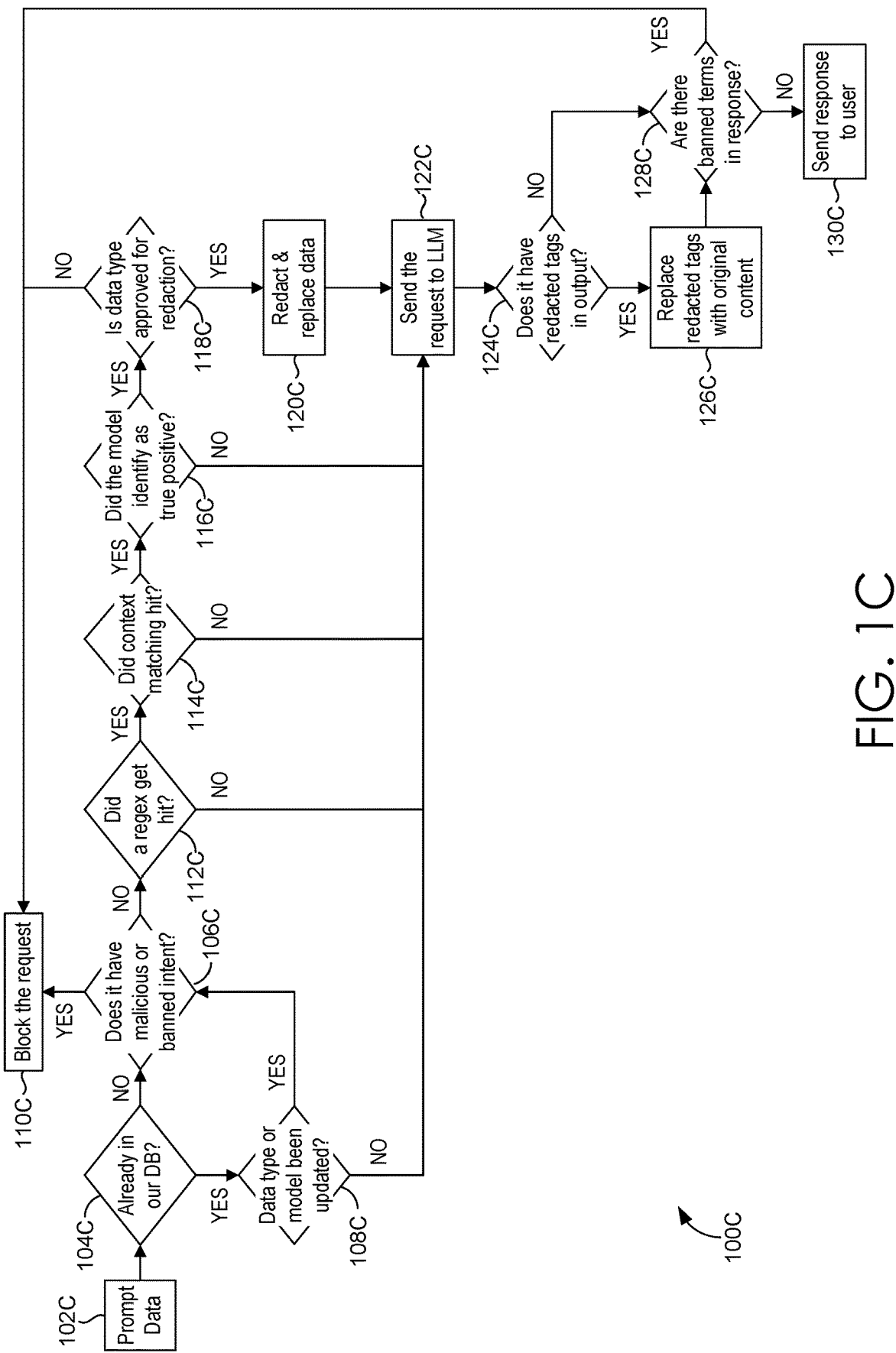
FIG. 1C-1F are schematics of an artificial intelligence system for providing generative AI security management in an item listing system, in accordance with aspects of the technology described herein.

With reference to FIG. 1C, FIG. 1C illustrates a schematic 100C associated with providing generative AI security management using a generative AI security engine in accordance with embodiments described herein. At block 102C, prompt data is received. At block 104C, a determination is made whether the prompt data is already stored in a prompt data database. If the prompt data is not already in the prompt data database, at block 106C a determination is made whether the prompt data has a malicious or banned intent. If the prompt data is already in the prompt data database, at block 108C, a determination is made whether the data type or model has been updated; and if yes, then at block 106C a determination is made whether the prompt data has a malicious or banned intent. If the prompt data is determined to have a malicious or banned intent, at block 110C, a request associated with the prompt data is blocked.

If the prompt data does not have a malicious or banned intent, a determination is made at block 112C whether a regex hit exists, if yes, at block 114C, a determination is made if a context matching hit exists; if yes, at block 116C, a determination is made if a model identified a true positive, at block 118C, a determination is made whether the data type is approved for redaction. If the data type is not approved for redaction, then at block 110C, the request associated with the prompt data is blocked. At block 118C, if the data type is not approved for redaction, then at block 120C, prompt data is redacted and replaced. At block 122C, the request associated with the prompt data is communicated to the LLM. The request is also communicated to the LLM when it is determined, at block 108C, that the data type or model have not been updated.

At block 124C, a determination is made whether there are one or more redacted data tags in output from the LLM. If a determination is made that there are one or more redacted data tags in the output, at block 126C, redacted data tags are replaced with original content. At block 128C, a determination is made whether there are any banned terms in the response. If a determination is made that there are one or more banned terms in the response, at block 110C, a request associated with the prompt data is blocked. If a determination is made that there are no banned terms in the response, at block 130C, the response is sent to the user.

Figure 1D:
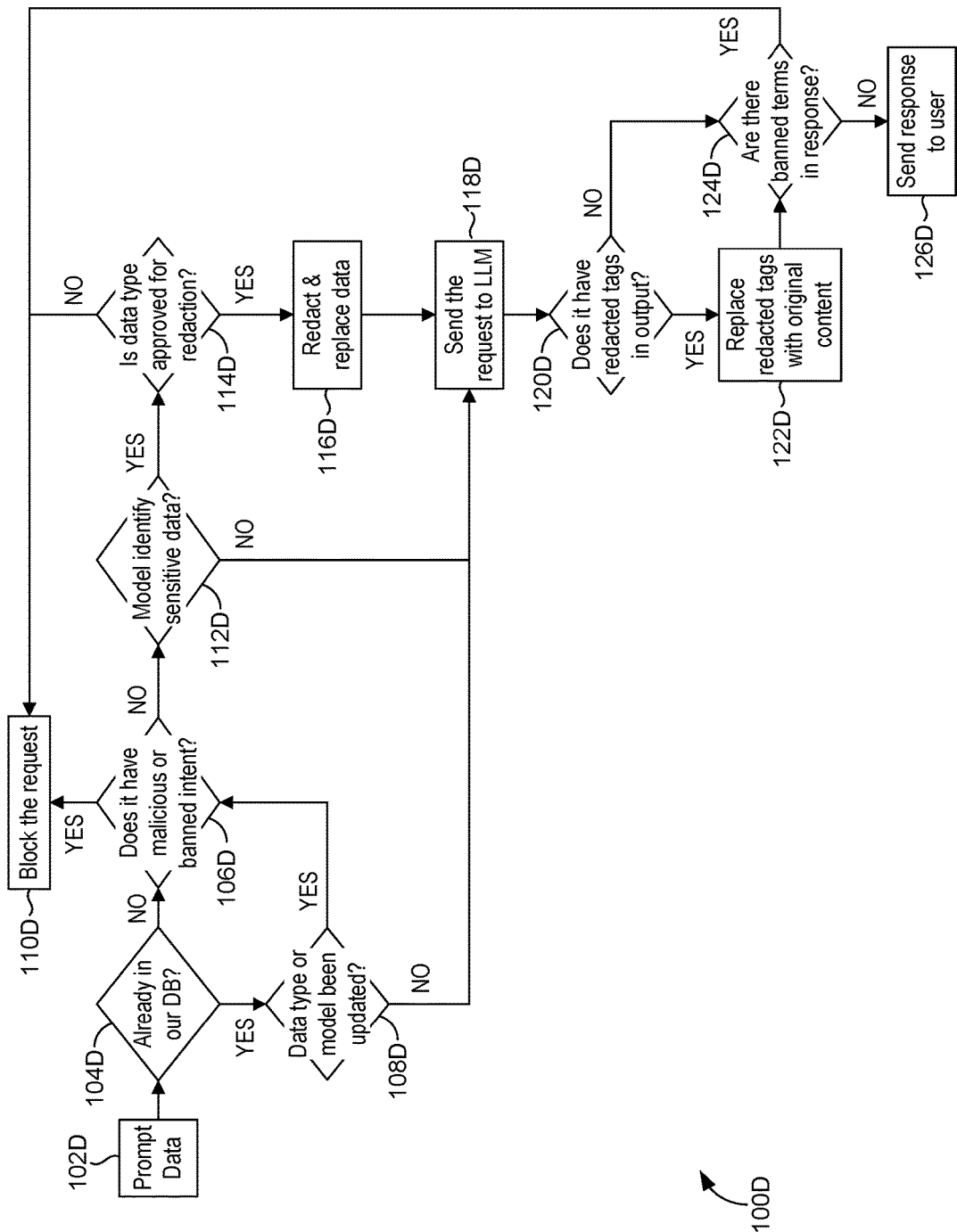

With reference to FIG. 1D, FIG. 1D illustrates a schematic 100D associated with providing generative AI security management using a generative AI security engine in accordance with embodiments described herein. At block 102D, prompt data is received. At block 104D, a determination is made whether the prompt data is already stored in a prompt data database. If the prompt data is not already in the prompt data database, at block 106D a determination is made whether the prompt data has a malicious or banned intent. If the prompt data is already in the prompt data database, at block 108D, a determination is made whether the data type or model has been updated; and if yes, then at block 106D a determination is made whether the prompt data has a malicious or banned intent. If the prompt data is determined to have a malicious or banned intent, at block 110D, a request associated with the prompt data is blocked.

If the prompt data does not have a malicious or banned intent, at block 112D, a determination is made if the model identified a model identified sensitive data, at block 114D, a determination is made whether the data type is approved for redaction. If the data type is approved for redaction, then at block 110D, a request associated with the prompt data is blocked. At block 114D, if the data type is not approved for redaction, then at block 116D, data is redacted and replaced. At block 118D, the request associated with the prompt data is communicated to the LLM. The request is also communicated to the LLM when it is determined, at block 108D, that the data type or model have not been updated.

At block 120D, a determination is made whether there are one or more redacted data tags in output from the LLM. If a determination is made that there are one or more redacted data tags in the output, at block 122D, redacted data tags are replaced with original content. At block 124D, a determination is made whether there are any banned terms in the response. If a determination is made that there are one or more banned terms in the response, at block 110D, a request associated with the prompt data is blocked. If a determination is made that there are no banned terms in the response, at block 126D, the response is sent to the user.

Figure 1E:
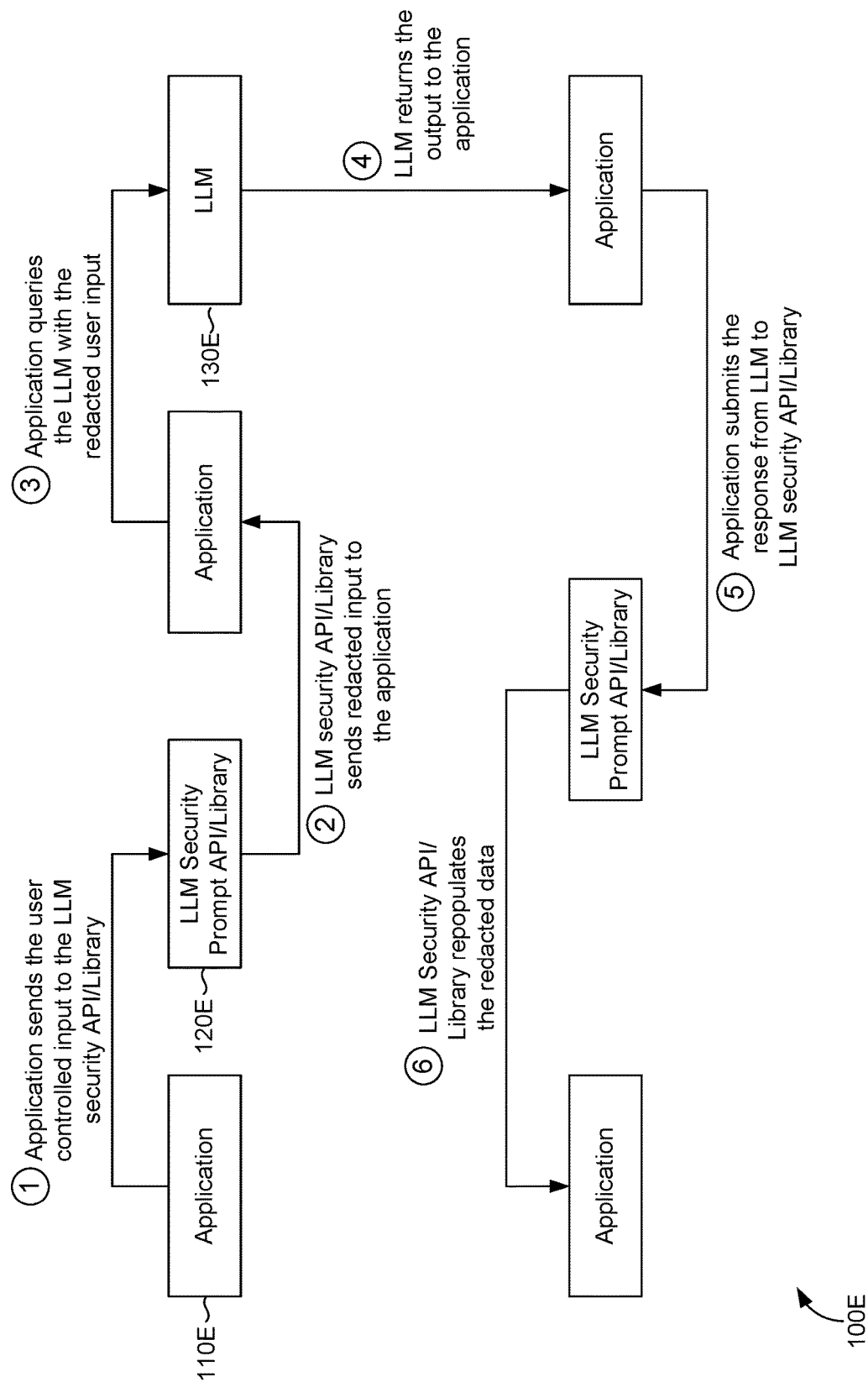

With reference to FIG. 1E, FIG. 1E illustrates a schematic associated with providing generative AI security management using a generative AI security engine in an item listing system 100E. The item listing system 100E includes Application 110E, LLM Security Prompt API/Library 120E, and LLM 130E as an exemplary implementation for providing generative AI security management. In particular, FIG. 1E illustrates an implementation where the generative AI security engine is implemented as an LLM Security Prompt API/Library 120E is placed between the Application 110E and the LLM 130E to protect against data leakage or prompt attacks. This implementation operates as a service API/Library that can be called as a standalone or an integrated component in any application that wants to employed the corresponding LLM.

In operation, at step 1, Application 110E sends user controlled input to the LLM security API/Library. At step 2, the LLM security API/Library sends redacted input to the Application 110E. At step 3, the Application 110E queries the LLM 130E with the redacted user input. At step 4, the LLM 130E returns the output to the Application 110E. The Application 110E submits the response from the LLM 130E to the LLM security API/Library 120E. At step 6, the LLM security API/Library repopulates the redacted data to the Application 110E.

Figure 1F:
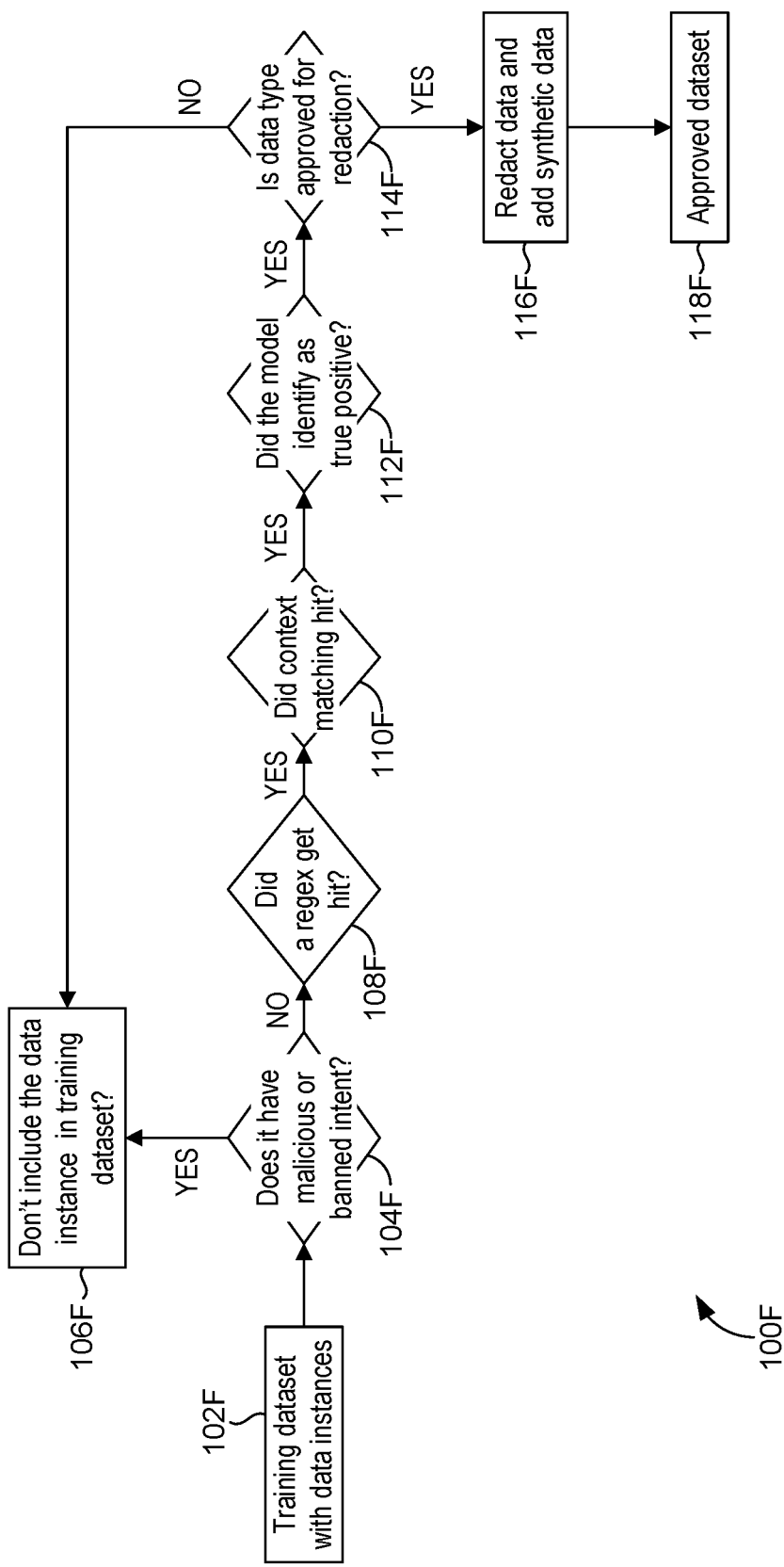

With reference to FIG. 1F, FIG. 1F illustrates a schematic associated with providing generative AI security management using a generative AI security engine in accordance with embodiments described herein. At block 102F, training dataset is received, the training dataset has a plurality of data instances. At block 104F, a determination is made whether a data instance has a malicious or banned intent. If the data instance is determined to have a malicious or banned intent, at block 106F, the data instance is excluded from the training dataset.

If the data instance does not have a malicious or banned intent, at block 108F, a determination is made whether a regex hit exists, if yes, at block 110F, a determination is made if a context matching hit exists; if yes, at block 112F, a determination is made if a model identified a true positive, if yes, at block 114F, a determination is made whether the data type is approved for redaction. If the data type is not approved for redaction, then at block 106F, the data instance is exclude from the training dataset. If the data type is approved for redaction, at block 116F, then at block 116F, a portion of the data instance is redacted and synthetic data replaces the portion of the data instance that is redacted. At block 118F, the data instance is approved.

Figure 2A:
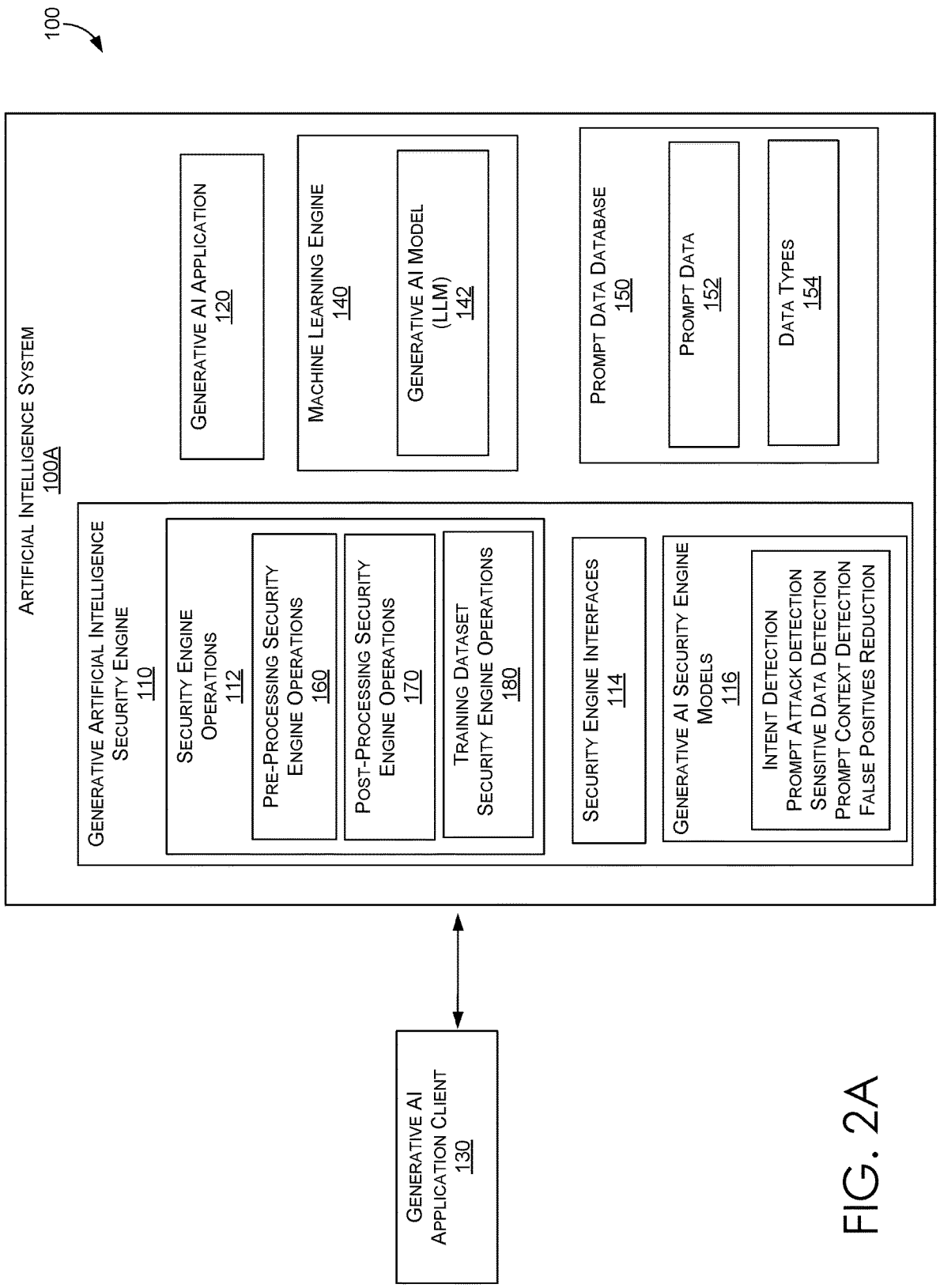
FIG. 2A is a block diagram of an artificial intelligence system for providing generative AI security management in an item listing system, in accordance with aspects of the technology described herein.
Figure 2B:
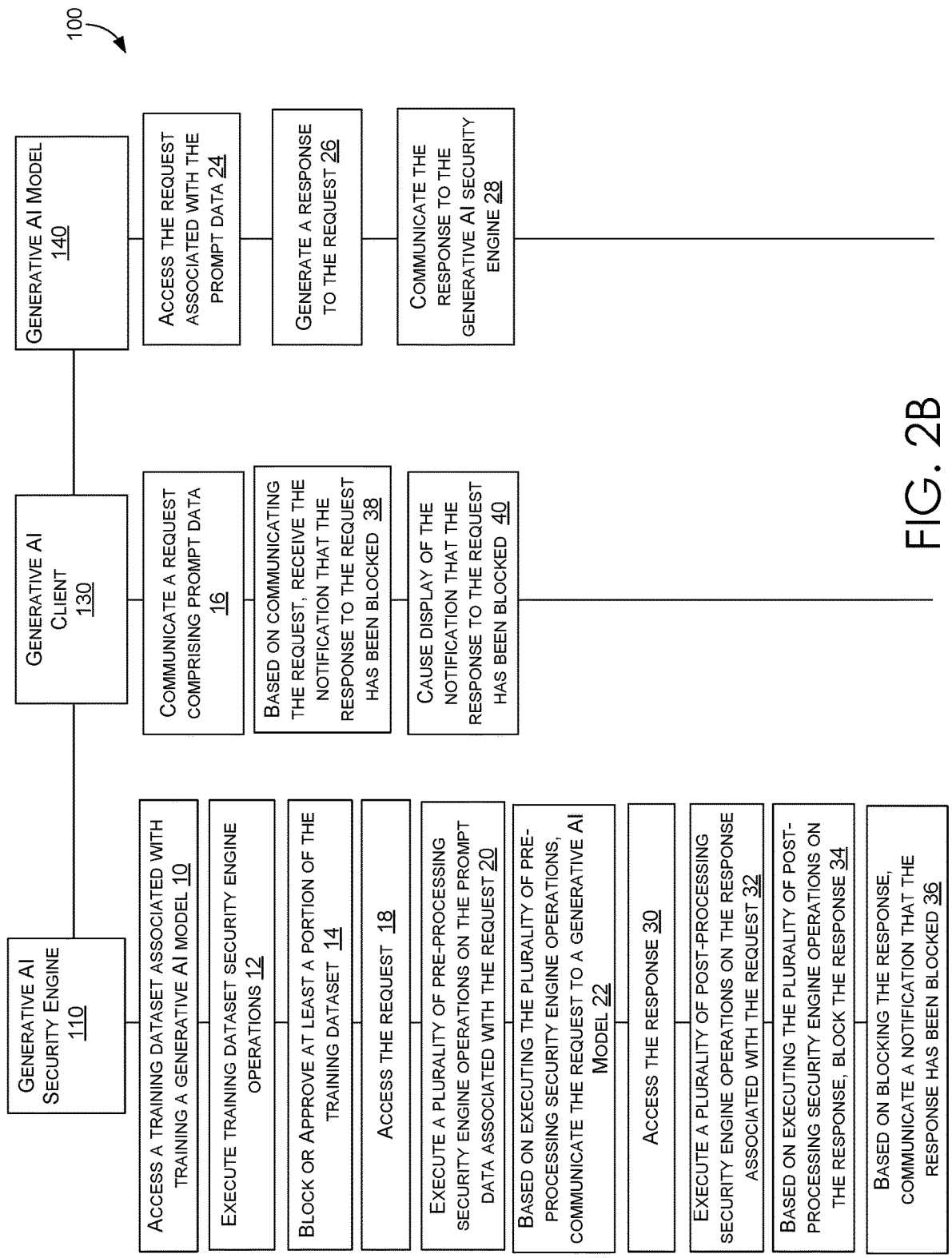
FIG. 2B is a block diagram of an artificial intelligence system for providing generative AI security management in an item listing system, in accordance with aspects of the technology described herein.

Aspects of the technical solution can be described by way of examples and with reference to FIGS. 2A and 2B. FIG. 2A is a block diagram of an exemplary technical solution environment, based on example environments described with reference to FIGS. 6A, 6B, 7 and 8 for use in implementing embodiments of the technical solution are shown. Generally the technical solution environment includes a technical solution system suitable for providing the example item listing system 100 in which methods of the present disclosure may be employed. In particular, FIG. 2A shows a high level architecture of the item listing system 100 in accordance with implementations of the present disclosure. Among other engines, managers, generators, selectors, or components not shown (collectively referred to herein as "components"), the item list platform system 100 of FIG. 2A corresponds to FIGS. 1A and 1B.

With reference to FIG. 2B, FIG. 2B illustrates artificial intelligence system 100A including generative AI intelligence security engine 110 having security engine operations 112 including pre-processing security engine operations 160, post-processing security engine operations 170, and training dataset security engine operations; security engine interfaces 114; generative AI security engine models 116; generative AI application 120; generative AI application client 130 having generative AI client interface data 132; machine learning engine 140 having generative AI model "LLM 142"); and prompt data database 150 with prompt data 152 and data types 154.

The generative AI security engine 110 is responsible for providing generative AI security management for artificial intelligence system 110A. The generative AI security engine 110 accesses prompt data associated with a generative artificial intelligence (AI) client 130 and a generative AI model 142 that supports artificial intelligence system 110A, the prompt data is associated with a request for the generate AI model and analyzes the prompt data (i.e., an instance of prompt data associated with a request) based on pre-processing security engine operations 160. The pre-processing security engine operations 160 support determining how to communicate the prompt data associated with the request to the generative AI model or block the prompt data associated with the request from the generative AI model.

Based on analyzing the prompt data, the generative AI security engine 110 generates a redacted version of the prompt data for the generative AI model, the redacted version of the prompt data comprising a redacted data tag associated with a redacted portion of the prompt data and communicates the redacted version of the prompt data to the generative AI model 142. The generative AI security engine 110 accesses a response from the generative AI model and analyzes the response based on post-processing security engine operations. The post-processing security engine operations 170 support determining how to communicate the response to the generative AI prompt client or determining to block the response from the generative AI client 130. Based on analyzing the response, generative AI security engine 110 communicates the response to the generative AI client or blocks the response to the request.

The generative AI security engine 110 the pre-processing security engine operations 160, the post-processing security engine operations 170, and training dataset security engine operations 170 that are selectively employed to provide generative AI security management in the artificial intelligence system 110A. The generative AI security engine 110 also includes a plurality of generative AI security engine models 116 including an intent detection model, a prompt attack detection model, a sensitive data detection model, a prompt context detection model, and false positive reduction model that are selectively employed to provide generative AI security management in an item listing system.

Pre-processing security engine operations 160 can include streamlining threat handling based on a prompt database (e.g., prompt database 150) including a plurality of previously processed prompt data. One or more other types of pre-processing security engine operations are circumvented upon determining that the prompt data matches an instance of previous processed prompt data in the prompt database and no updates have been executed on data types and generative AI security engine models associated with the pre-processing security engine operations. The prompt database 150 further includes a plurality data types, where a first plurality of data types are identified to be redacted in any context, where a second plurality of data types are identified to be redacted based on an identified prompt context for a corresponding instance of prompt data.

The generative AI security engine 110 can include a regular expression engine and a false positive reduction model, where the false positive reduction model evaluates positive outputs from the regular expression engine to determine whether positive outputs are false positives. The generative AI security engine 110 can include a redact and replace engine—that operates to redact a portion of an instance of prompt data and replace the redacted portion with a redacted data tag—and a redacted data tag review and replaced engine associated with reviewing an instance of a response for a redacted data tag and replacing the redacted data tag with previously redacted data.

The training dataset security engine operations 180 are responsible for excluding instances of data in the training dataset from an approved training dataset, or approving instances of data in the training dataset for the approved training dataset. The training data security engine operations 180 are selectively include one or more pre-processing security engine operations. The machine learning engine 140 can be implemented as part of the generative AI security engine 110, or separately from the generative AI security engine 110. The machine learning engine 140 (e.g., via the generative AI security engine 110) operates to access a training dataset associated with training an instance of a generative AI training model; analyze the training dataset using training dataset security engine operations; based on analyzing the training data, generate a redacted version of the training dataset; or block at least an instance of training data from the training dataset. The redacted version of the training dataset comprises an instance of training data including synthetic data generated to replace a portion of the instance of training data that was redacted.

The generative AI application client 130 operates to communicate a first request associated with first prompt data; based on communicating the first request, receive a first response that is generated based on a redacted version of the first prompt data; and cause display of the first response. The generative AI application client 130 can further communicate a second request associated with second prompt data, and based on communicating the second request, receive a second response comprising a notification that the second request has been blocked; and cause display of the second response.

With reference to FIG. 2B, FIG. 2B illustrates generative AI security engine 110, generative AI application client 130, and generative AI model 140 for providing generative AI security management in an item list system 100. At block 10, the generative AI security engine 110 accesses a training dataset associated with train a generative AI model; at block 12, executes secure training dataset security engine operations on the training dataset; at block 14, based on executing the training dataset security engine operations, blocks or approves at least a portion of the training dataset.

At block 16, the generative AI application client 130 communicates a request comprising prompt data. At block 18, the generative AI security engine 110 accesses the request; at block 20 executes a plurality of pre-processing security engine operations on the prompt data associated with the request; at block 22, based on executing the plurality of pre-processing security engine operations, communicates the request to a generative AI model. At block 24, the generative AI model accesses the request associated with the prompt data; at block 26, generates a response to the request; and at block 28, communicates the response to the generative AI security engine.

At block 30, the generative AI security engine 110 accesses the response; at block 32, executes a plurality of post-processing security engine operations on the response associated with the request; at block 34, based on executing the plurality of post-processing security engine operation on the response, blocks the response; at block 36, based on blocking the response, communicates a notification that the response has been blocked. At block 38, the generative AI client, based on communicating the request, receives the notification that the response to the request has been blocked; and at block 40, causes display of the notification that the response to the request has been blocked.

Example Methods

Figure 3:
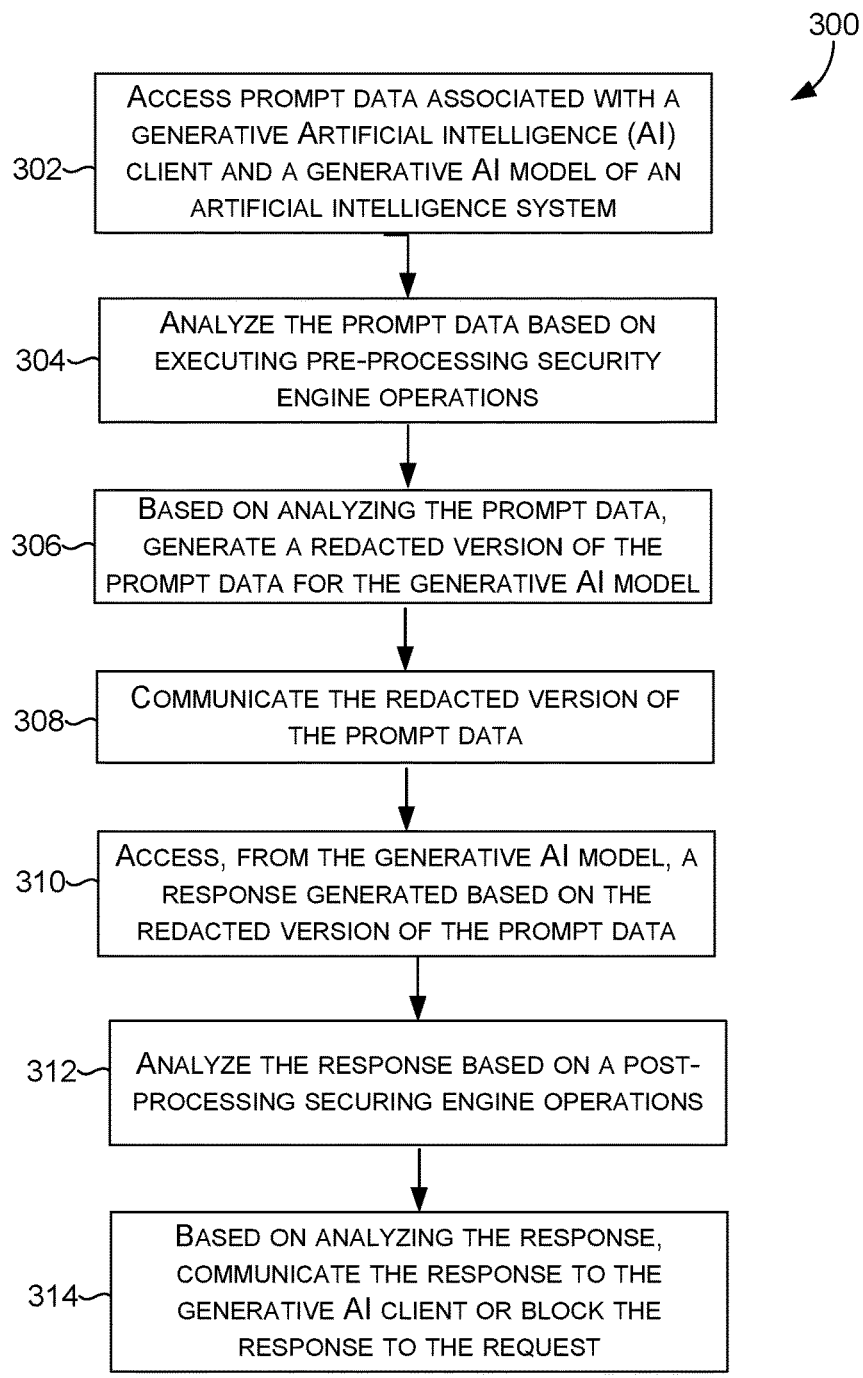
FIG. 3 provides a first exemplary method of providing generative AI security management in an item listing system, in accordance with aspects of the technology described herein.
Figure 4:
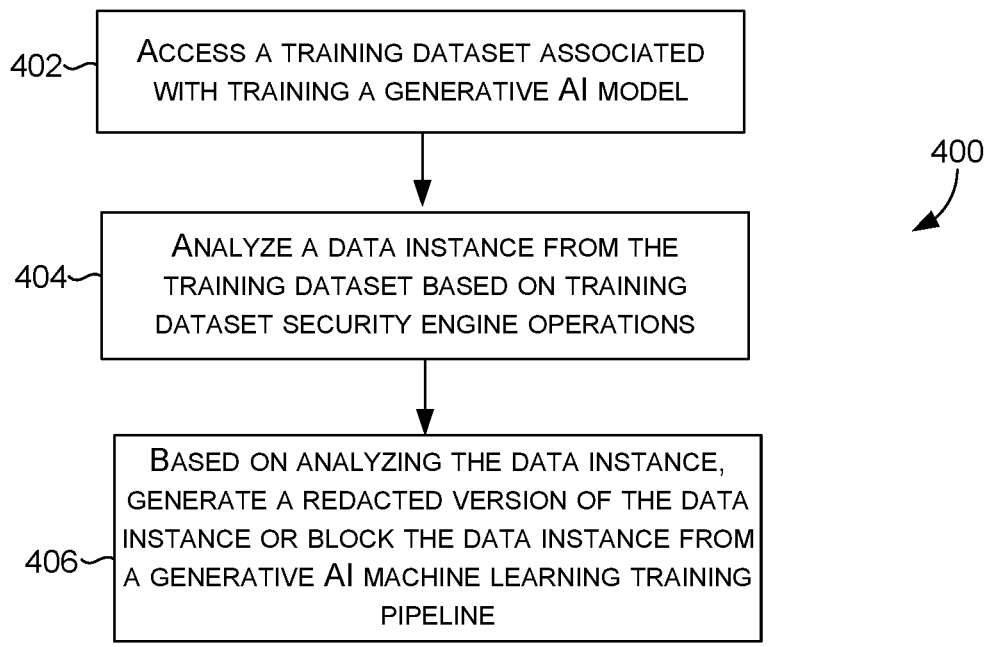
FIG. 4 provides a second exemplary method of providing generative AI security management in an item listing system, in accordance with aspects of the technology described herein.
Figure 5:
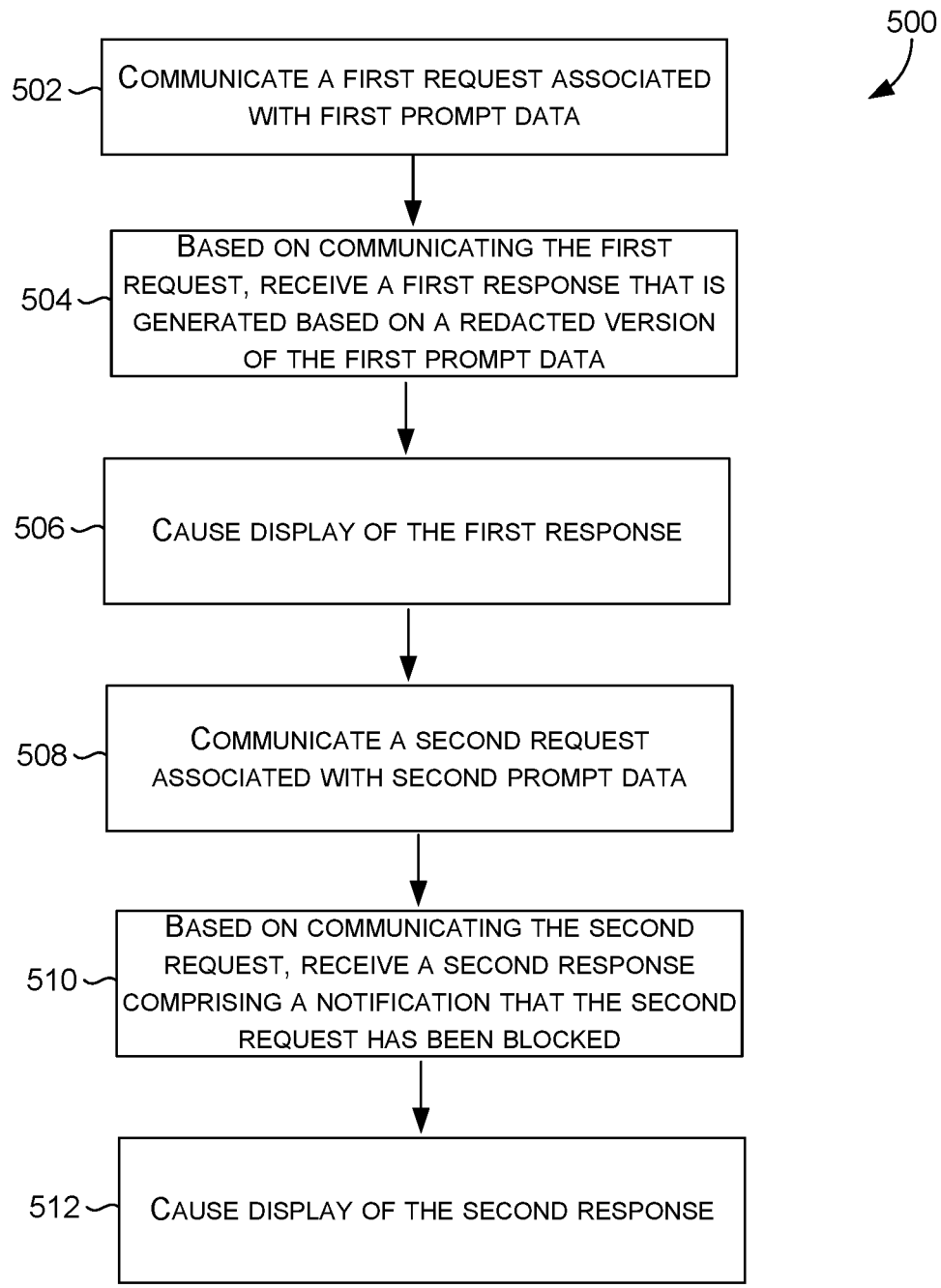
FIG. 5 provides a third exemplary method of providing generative AI security management in an item listing system, in accordance with aspects of the technology described herein.

With reference to FIGS. 3, 4, and 5 flow diagrams that illustrate methods for providing generative AI security management using a generative AI security engine in an item listing system. The methods may be performed using the item listing system described herein. In embodiments, one or more computer-storage media having computer-executable or computer-useable instructions embodied thereon that, when executed, by one or more processors can cause the one or more processors to perform the methods (e.g., computer implemented method) in an item listing system (e.g., computerized system or computer system).

Turning to FIG. 3, a flow diagram is provided that illustrates a method 300 for providing generative AI security management using a generative AI security engine in an item listing system. At block 302, the generative AI security engine accesses prompt data associated with a generative AI client and a generative AI model of an artificial intelligence system. At block 304, the generative AI security engine analyzes the prompt data based on executing pre-processing security engine operations. The pre-processing security engine operations support determining how to communicate the prompt data associated with the request to the generative AI model or determining to block the request. At block 306, based on analyzing the prompt data, the generative AI security engine generates a redacted version of the prompt data for the generative AI model. At block 308, the generative AI security engine communicates the redacted version of the prompt data to the generative AI model. At block 310, the generative AI security engine accesses a response, from the generative AI model, generated based on the redacted version of the prompt data. At block 312, the generative AI security engine analyzes the response based on post-processing security engine operations. The post-processing security engine operations support determining how to communicate the response to the generative AI client or determining to block the response. At block 314, based on analyzing the response, the generative AI security engine communicates the response to the generative AI client or blocks the response to the request.

Turning to FIG. 4, a flow diagram is provided that illustrates a method 400 for providing generative AI security management using a generative AI security engine in an item listing system. At block 402, the generative AI security engine accesses a training dataset associated with training a generative AI model. At block 404, the generative AI security engine analyzes a data instance from the training dataset based on a plurality of training dataset security operations. At block 406, based on analyzing the data instance, the generative AI security engine generates a redacted version of the data instance or blocks the data instance of the training dataset from an approved training dataset for a generative AI machine learning training pipeline.

Turning to FIG. 5, a flow diagram is provided that illustrates a method 500 for providing generative AI security management using a generative AI security engine in an item listing system. At block 502, a generative AI client communicates a first request associated with first prompt data. At block 504, based on communicating the first request, the generative AI client receives a first response that is generated based on a redacted version of the first prompt data. At block 506, the generative AI client causes display of the first response. At block 508, the generative AI client communicates a second request associated with second prompt data. At block 510, based on communicating the second request, the generative AI client receives a second response comprising a notification that the second request has been blocked. At block 512, the generative AI client causes display of the second response.

Technical Improvement

Embodiments of the present invention have been described with reference to several inventive features (e.g., operations, systems, engines, and components) associated with an item listing system. Inventive features described include: operations, interfaces, data structures, and arrangements of computing resources associated with providing the functionality described herein relative with reference to a generative AI security engine associated with an artificial intelligence system.

Embodiments of the present invention relate to the field of computing, and more particularly to an artificial intelligence system. The following described exemplary embodiments provide a system, method, and program product to, among other things, execute generative AI security engine operations that provide generative AI security management. Therefore, the present embodiments improve the technical field of artificial intelligence technology and item listing platform technology by providing more effective security. For example, the generative AI security engine provides generative AI security engine operations ("security engine operations") including intent detection, prompt attack detection, restricted data detection and redaction, and prompt context with redaction that are employed to protect against potential data privacy and data leakage issues for generative AI applications. In particular, the particular manner of summarizing and presenting security management data do not use conventional security technology. The technical solution addresses conventional item listing platforms' lack of integration of a generative AI security engine based on improving artificial intelligence technology by improving security features in the artificial intelligence system.

Functionality of the embodiments of the present invention have further been described, by way of an implementation and anecdotal examples—to demonstrate that the operations for providing generative AI security management using a generative AI security engine in an item listing system as a solution to a specific problem in artificial intelligence technology to improve computing operations in artificial intelligence systems. Overall, these improvements result in less CPU computation, smaller memory requirements, and increased flexibility in artificial intelligence systems when compared to previous conventional artificial intelligence system operations performed for similar functionality.

Additional Support for Detailed Description of the Invention

Example Item Listing System Environment

Figure 6:
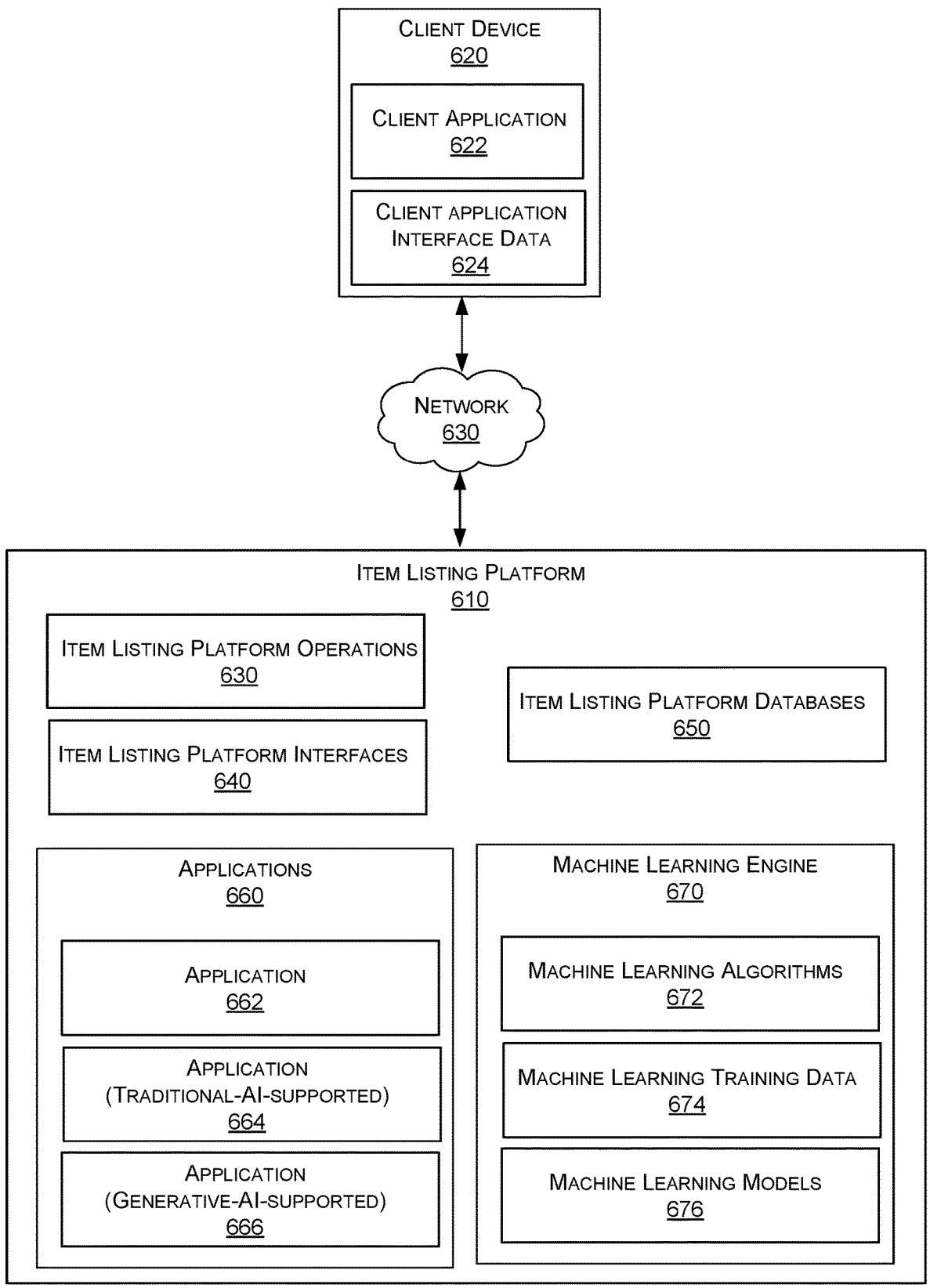
FIG. 6 provides a block diagram of an exemplary item listing system computing environment suitable for use in implementing aspects of the technology described herein.

Referring now to FIG. 6, FIG. 6 illustrates an example item listing system 600 computing environment in which implementations of the present disclosure may be employed. In particular, FIG. 6 shows a high level architecture of an example item listing platform 610 that can host a technical solution environment, or a portion thereof. It should be understood that this and other arrangements described herein are set forth as examples. For example, as described above, many elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The item listing system 600 can be a cloud computing environment that provides computing resources for functionality associated with the item listing platform 610. For example, the item listing system 600 supports delivery of computing components and services—including servers, storage, databases, networking, applications, and machine learning associated with the item listing platform 610 and client device 620. A plurality of client devices (e.g., client device 620) include hardware or software that access resources on the item listing system 600. Client device 620 can include an application (e.g., client application 622) and interface data (e.g., client application interface data 624) that support client-side functionality associated with the item listing system. The plurality of client devices can access computing components of the item listing system 600 via a network (e.g., network 630) to perform computing operations.

The item listing platform 610 is responsible for providing a computing environment or architecture that includes the infrastructure that supports providing item listing platform functionality (e.g., e-commerce functionality). The item listing platform support storing item in item databases and providing a search system for receiving queries and identifying search results based on the queries. The item listing platform may also provide a computing environment with features for managing, selling, buying, and recommending different types of items. Item listing platform 610 can specifically be for a content platform such as EBAY content platform or e-commerce platform, developed by EBAY INC., of San Jose, California.

The item listing platform 610 can provide item listing operations 630 and item listing interfaces 640. The item listing operations 630 can include service operations, communication operations, resource management operations, security operations, and fault tolerance operations that support specific tasks or functions in the item listing platform 610. The item listing interfaces 640 can include service interfaces, communication interfaces, resource interfaces, security interfaces, and management and monitoring interfaces that support functionality between the item listing platform components. The item listing operations 630 and item listing interfaces 640 can enable communication, coordination and seamless functioning of the item listing system 600.

By way of example, functionality associated with item listing platform 610 can include shopping operations (e.g., product search and browsing, product selection and shopping cart, checkout and payment, and order tracking); user account operations (e.g., user registration and authentication, and user profiles); seller and product management operations (e.g., seller registration and product listing and inventory management); payment and financial operations (e.g., payment processing, refunds and returns); order fulfillment operations (e.g., order processing and fulfillment and inventory management); customer support and communication interfaces (e.g., customer support chat/email and notifications); security and privacy interfaces (e.g., authentication and authorization, payment security); recommendation and personalization interfaces (e.g., product recommendations and customer reviews and ratings); analytics and report interfaces (e.g., sales and inventory reports, and user behavior analytics); and APIs and Integration Interfaces (e.g., APIs for Third-Party Integration).

The item listing platform 610 can provide item listing platform databases (e.g., item listing platform databases 650) to manage and store different types of data efficiently. The item listing platform databases 650 can include relational databases, NoSQL databases, search databases, cache databases, content management systems, analytics databases, payment gateway database, customer relationship management databases, log and error databases, inventory and supply chain databases, and multi-channel databases that are used in combination to efficiently manage data and provide e-commerce experience for users.

The item listing platform 610 supports applications (e.g., applications 660) that is a computer program or software component or service that serves a specific function or set of functions to fulfil a particular item listing platform requirement or user requirement. Applications can be client-side (user-facing) and server-side (backend). Applications can also include application without any AI support (e.g., application 662) application supported by traditional AI model (e.g., application 664), and applications supported by generative AI models (e.g., application 666). By way of example, applications can include an online storefront application, mobile shopping app, admin and management console, payment gateway integration, user account and authentication application, search and recommendation engines, inventory and stock management application, order processing and fulfillment application, customer support and communication tools, content management system, analytics and report applications, marketing and promotion applications, multi-channel integration applications, log and error tracking applications, customer relationship management (CRM) applications, security applications, and APIs and web services that are used in combination to efficiently deliver e-commerce experiences for users.

The items listing platform 610 can include a machine learning engine (e.g., machine learning engine 670). The machine learning engine 670 refers to machine learning framework or machine learning platform that provides the infrastructure and tools to design, train, evaluate, and deploy machine learning models. The machine learning engine 670 can serve as the backbone for developing and deploying machine learning applications and solutions. Machine learning engine 670 can also provide tools for visualizing data and model results, as well as interpreting model decisions to gain insights into how the model is making predictions.

The machine learning engine 670 can provide the necessary libraries, algorithms, and utilities to perform various tasks within the machine learning workflow. The machine learning workflow can include data processing, model selection, model training, model evaluation, hyperparameter tuning, scalability, model deployment, inference, integration, customization, data visualization. Machine learning engine 670 can include pre-trained models for various tasks, simplifying the development process. In this way, the machine learning engine 670 can streamline the entire machine learning process, from data preparation and model training to deployment and inference, making it accessible and efficient for different types of users (e.g., customers, data scientists, machine learning engineers, and developers) working on a wide range of machine learning applications.

Machine learning engine 670 can be implemented in the item listing system 600 as a component that leverages machine learning algorithms and techniques (e.g., machine learning algorithms 672) to enhance various aspects of the item listing system's functionality. Machine learning engine 670 can provide a selection of machine learning algorithms and techniques used to teach computers to learn from data and make predictions or decisions without being explicitly programmed. These techniques are widely used in various applications across different industries, and can include the following examples: supervised learning (e.g., linear regression: classification, support vector machines (SVM); unsupervised learning (e.g., clustering, principal component analysis (PCA), association rules (e.g., apriori); reinforcement learning (e.g., Q-Learning, deep Q-Network (DQN); and deep learning (e.g., neural networks, convolutional neural networks (CNN), and recurrent neural networks (RNN); and ensemble learning random forest.

Machine learning training data 120 supports the process of building, training, and fine-tuning machine learning models. Machine learning training data 120 consists of a labeled dataset that is used to teach a machine learning model to recognize patterns, make predictions, or perform specific tasks. Training data typically comprises two main components: input feature (X) and labels or target values (Y). Input features can include variables, attributes, or characteristics used as input to the machine learning model. Input features (X) can be numeric, categorical, or even textual, depending on the nature of the problem. For example, in a model for predicting house prices, input features might include the number of bedrooms, square footage, neighborhood, and so on. Labels or target values (Y) include the values that the model aims to predict or classify. Labels represent the desired output or the ground truth for each corresponding set of input features. For instance, in a spam email classifier, the labels would indicate whether each email is spam or not (i.e., binary classification). The training process involves presenting the model with the training data, and the model learns to make predictions or decisions by identifying patterns and relationships between the input features (X) and the target values (Y). A machine learning algorithm adjusts its internal parameters during training in order to minimize the difference between its predictions and the actual labels in the training data. Machine learning engine 670 can use historical and real-time data to train models and make predictions, continually improving performance and user experience.

Machine learning engine 670 can include machine learning models (e.g., machine learning models 676) generated using the machine learning engine workflow. Machine learning models 676 can include generative AI models and traditional AI models that can both be employed in the item listing system 600. Generative AI models are designed to generate new data, often in the form of text, images, or other media, based on patterns and knowledge learned from existing data. Generative AI models can be employed in various ways including: content generation, product image generation, personalized product recommendations, natural language chatbots, and content summarization. Traditional AI models encompass a wide range of algorithms and techniques and can be employed in various ways including: recommendation systems, predictive analytics, search algorithms, fraud detection, customer segmentation, image classification, Natural Language Processing (NLP) and A/B testing and optimization. In many cases, a combination of both generative and traditional AI models can be employed to provide a well-rounded and effective e-commerce experience, combining data-driven insights and creativity.

Machine learning engine 670 can be used to analyze data, make predictions, and automate processes to provide a more personalized and efficient shopping experience for users. By way of example, product recommendations search and filtering: pricing optimization, inventory and stock management: customer segmentation, churn prediction and retention, fraud detection, sentiment analysis, customer support and chatbots, image and video analysis, and ad targeting and marketing. The specific applications of machine learning within the item listing platform 610 can vary depending on the specific goals, available data, and resources.

Example Distributed Computing System Environment

Figure 7:
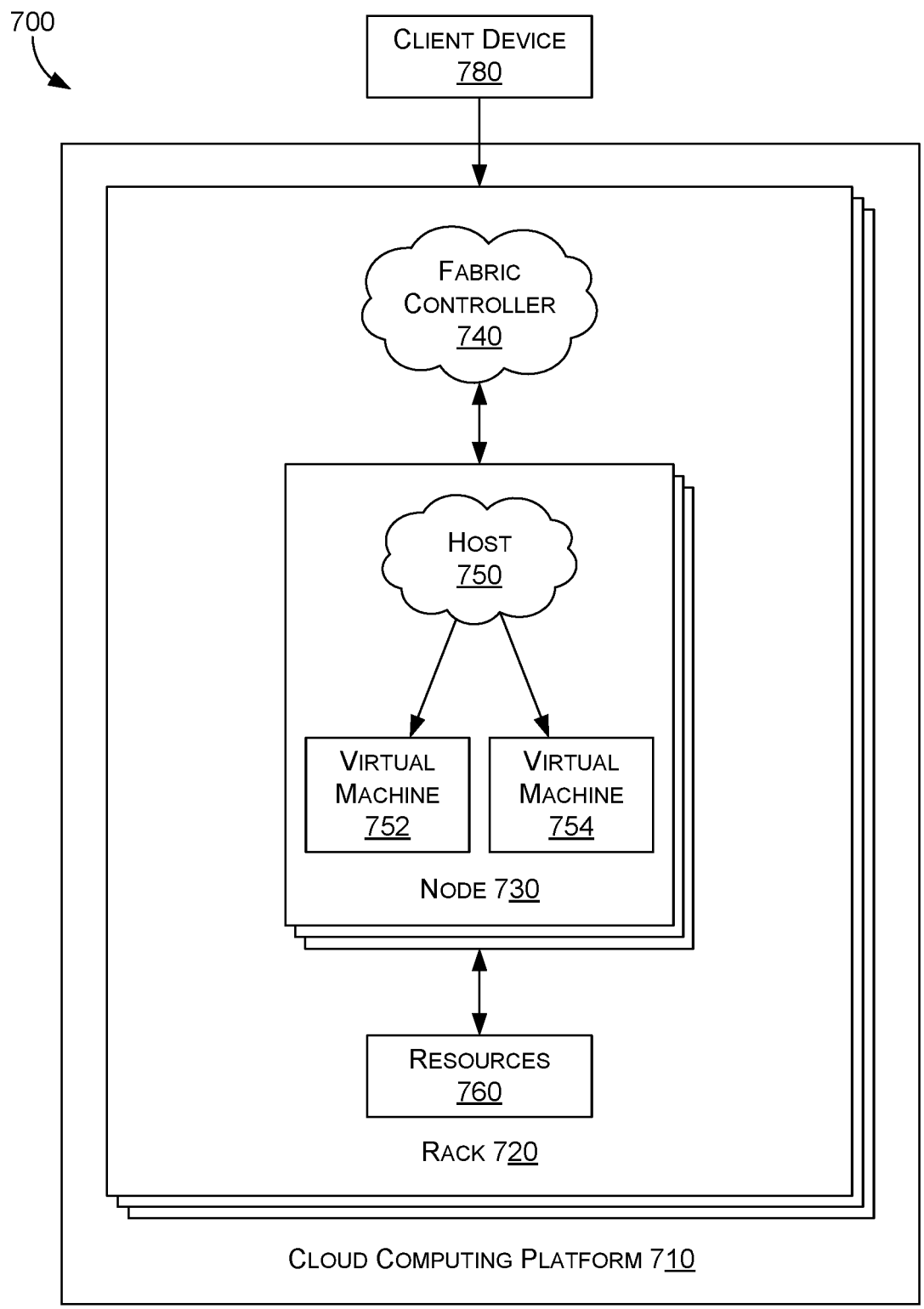
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Computing Environment

Figure 8:
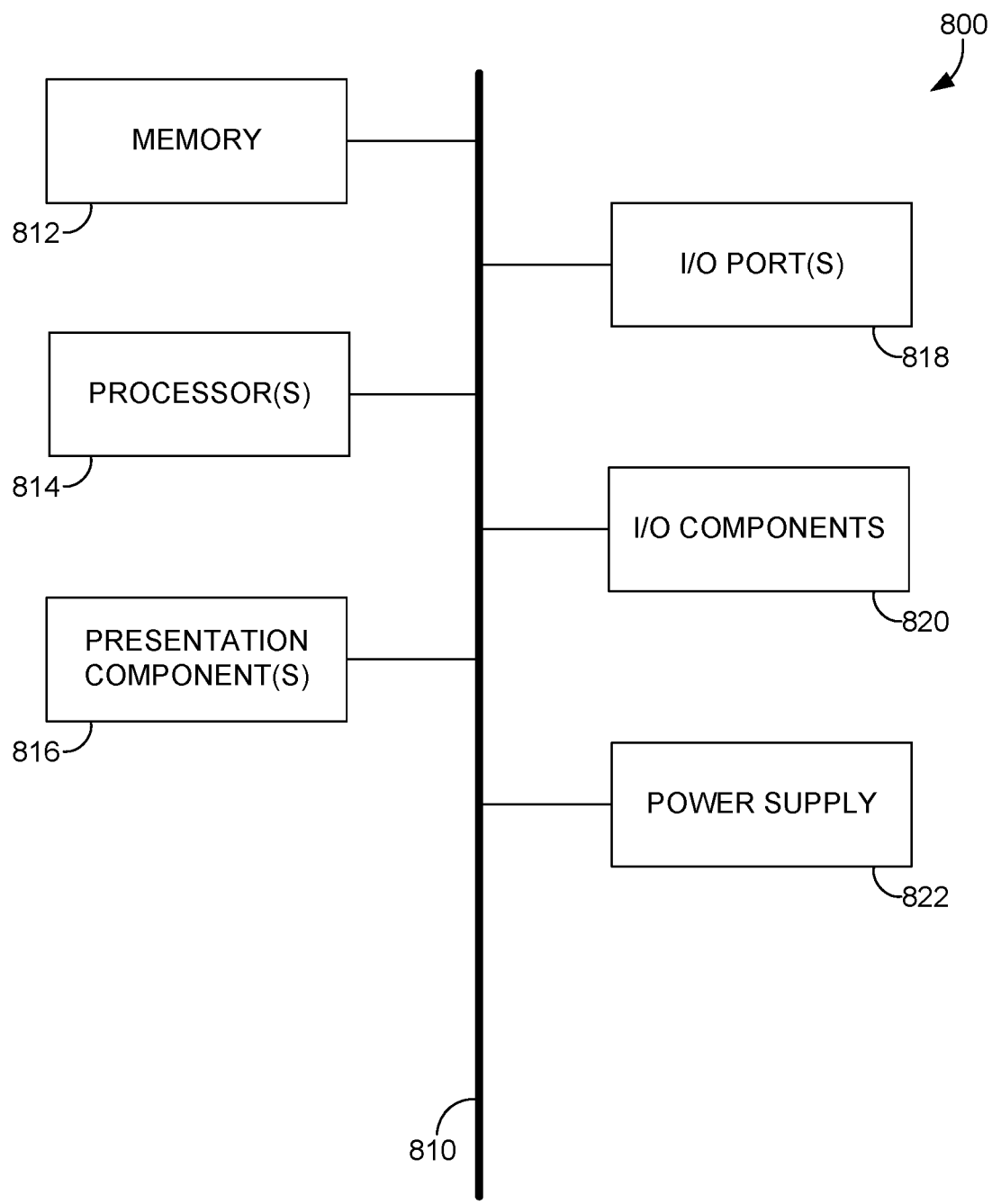
FIG. 8 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
   one or more computer processors; and
   computer memory storing computer-useable instructions that, when used by the one or more computer processors, cause the one or more computer processors to perform operations, the operations comprising:
   accessing prompt data associated with a generative artificial intelligence (AI) client and a generative AI model that supports an artificial intelligence system, wherein the prompt data is associated with a request for the generate AI model;
   analyzing the prompt data based on pre-processing security engine operations, wherein the pre-processing security engine operations support determining how to communicate the prompt data associated with the request to the generative AI model or block the prompt data associated with the request from the generative AI model;
   based on analyzing the prompt data, generating a redacted version of the prompt data for the generative AI model, the redacted version of the prompt data comprising a redacted data tag associated with a redacted portion of the prompt data;
   communicating the redacted version of the prompt data to the generative AI model;
   accessing a response from the generative AI model;
   analyzing the response based on post-processing security engine operations, wherein the post-processing security engine operations support determining how to communicate the response to the generative AI prompt client or determining to block the response from the generative AI client; and
   based on analyzing the response, communicating the response to the generative AI client or blocking the response to the request.

2. The system of claim 1, further comprising a generative AI security engine comprising the pre-processing security engine operations, the post-processing security engine operations, and training dataset security engine operations that are selectively employed to provide generative AI security management in the artificial intelligence system.

3. The system of claim 1, further comprising a generative AI security engine comprising a plurality of generative AI security engine models including an intent detection model, a prompt attack detection model, a sensitive data detection model, a prompt context detection model, and false positive reduction model that are selectively employed to provide generative AI security management in an item listing system.

4. The system of claim 1, further comprising streamlining threat handling based on a prompt database comprising a plurality of previously processed prompt data, wherein the one or more of the pre-processing security engine operations are circumvented upon determining that the prompt data matches an instance of previous processed prompt data in the prompt database and no updates have been executed on data types and generative AI security engine models associated with the pre-processing security engine operations.

5. The system of claim 1, further comprising a plurality data types, wherein a first plurality of data types are identified to be redacted in any context, wherein a second plurality of data types are identified to be redacted based on an identified prompt context for a corresponding instance of prompt data.

6. The system of claim 1, further comprising a regular expression engine and a false positive reduction model, wherein the false positive reduction model evaluates positive outputs from the regular expression engine to determine whether positive outputs are false positives.

7. The system of claim 1, further comprising a redact and replace engine associated with redacting a portion of an instance of prompt data and replacing the redacted portion with a redacted data tag; and a redacted data tag review and replaced engine associated with reviewing an instance of a response for a redacted data tag and replacing the redacted data tag with previously redacted data.

8. The system of claim 1, further comprising training dataset security engine operations associated with excluding instances of data in the training dataset from an approved training dataset, or approving instances of data in the training dataset for the approved training dataset, wherein the training data security engine operations selectively include pre-processing security engine operations.

9. The system of claim 1, the operations further comprising:
   communicating a first request associated with first prompt data;

based on communicating the first request, receiving a first response that is generated based on a redacted version of the first prompt data;
causing display of the first response;
communicating a second request associated with second prompt data;
based on communicating the second request, receiving a second response comprising a notification that the second request has been blocked; and
causing display of the second response.

10. The system of claim 1, the operations further comprising:
accessing a training dataset associated with training an instance of a generative AI training model;
analyzing the training dataset using training dataset security engine operations;
based on analyzing the training dataset, generating a redacted version of the training dataset, the redacted version of the training dataset comprising synthetic data; or
blocking at least an instance of training data from the training dataset.

11. One or more computer-storage media having computer-executable instructions embodied thereon that, when executed by a computing system having a processor and memory, cause the processor to perform operations, the operations comprising:
communicating a first request associated with first prompt data;
based on communicating the first request, receiving a first response that is generated based on a redacted version of the first prompt data, wherein responses to prompt data are generated based on processing the prompt data using a generative artificial intelligence (AI) security engine that supports an artificial intelligence system based on providing pre-processing security engine operations and post-processing security operations for generative AI security management in the artificial intelligence system;
causing display of the first response;
communicating a second request associated with second prompt data;
based on communicating the second request, receiving a second response comprising a notification that the second request has been blocked; and
causing display of the second response.

12. The media of claim 11, wherein the generative AI security engine further comprises training dataset security engine operations that support securing training dataset associated with training generative AI models in the artificial intelligence system.

13. The media of claim 11, wherein the generative AI security engine further comprises a plurality of generative AI security engine models including an intent detection model, a prompt attack detection model, a sensitive data detection model, a prompt context detection model, and false positive reduction model that are selectively employed to provide generative AI security management in an item listing system.

14. The media of claim 11, wherein the first prompt data is processed based on the pre-processing security engine operations and post-processing security engine operations.

15. The media of claim 11, wherein the second prompt data is processed based exclusively on the pre-processing security engine operations, wherein the pre-processing security engine operations cause the second prompt data to be blocked.

16. A computer-implemented method, the method comprising:
communicating a first request associated with first prompt data;
based on communicating the first request, receiving a first response that is generated based on a redacted version of the first prompt data, wherein responses to prompt data are generated based on processing the prompt data using a generative artificial intelligence (AI) security engine that supports an artificial intelligence system based on providing pre-processing security engine operations and post-processing security operations for generative AI security management in the artificial intelligence system;
causing display of the first response;
communicating a second request associated with second prompt data;
based on communicating the second request, receiving a second response comprising a notification that the second request has been blocked; and
causing display of the second response.

17. The method of claim 16, wherein the generative AI security engine further comprises training dataset security engine operations that support securing training dataset associated with training generative AI models in the artificial intelligence system.

18. The method of claim 16, wherein the generative AI security engine further comprises a plurality of generative AI security engine models including an intent detection model, a prompt attack detection model, a sensitive data detection model, a prompt context detection model, and false positive reduction model that are selectively employed to provide generative AI security management in an item listing system.

19. The method of claim 16, wherein the first prompt data is processed based on the pre-processing security engine operations and post-processing security engine operations.

20. The method of claim 16, wherein the second prompt data is processed based exclusively on the pre-processing security engine operations, wherein the pre-processing security engine operations cause the second prompt data to be blocked.

* * * * *